United States Patent

Long

[11] Patent Number: 6,142,095
[45] Date of Patent: Nov. 7, 2000

[54] MACHINE FOR COATING PARTICULATE MATERIAL

[75] Inventor: Richard L. Long, Ames, Iowa

[73] Assignee: Coating Machinery Systems, Inc., Huxley, Iowa

[21] Appl. No.: 09/089,911

[22] Filed: Jun. 3, 1998

[51] Int. Cl.[7] .............................. A23C 3/26; B05C 7/04; B05C 11/00; B01F 9/02; F26B 11/04

[52] U.S. Cl. .................................. 118/13; 118/19; 118/20; 118/24; 118/64; 118/303; 118/417; 118/418; 427/212; 427/421; 34/602; 366/234

[58] Field of Search .................................. 118/13, 17, 20, 118/24, 25, 31, 64, 303, 417, 418; 427/212, 421; 34/595, 602, 603; 366/234

[56] References Cited

U.S. PATENT DOCUMENTS

| | | |
|---|---|---|
| 39,722 | 9/1863 | Dole et al. . |
| 1,391,604 | 9/1921 | Baumgard . |
| 3,729,834 | 5/1973 | Fox . |
| 3,877,415 | 4/1975 | Blouin . |
| 3,883,959 | 5/1975 | Neville . |
| 3,934,545 | 1/1976 | Schady . |
| 4,027,624 | 6/1977 | Motoyama . |
| 4,154,538 | 5/1979 | Linnhoff et al. .......................... 366/188 |
| 4,222,865 | 9/1980 | Valeri et al. ............................. 209/399 |
| 4,272,234 | 6/1981 | Tse . |
| 4,308,669 | 1/1982 | Noyes et al. . |
| 4,507,335 | 3/1985 | Mathur . |
| 4,543,906 | 10/1985 | Glatt et al. . |
| 4,586,457 | 5/1986 | Dunajtschik . |
| 4,639,383 | 1/1987 | Casey . |
| 4,640,218 | 2/1987 | Motoyama et al. . |
| 4,686,115 | 8/1987 | Majer . |
| 4,862,826 | 9/1989 | Christen . |
| 5,395,449 | 3/1995 | Quadir et al. . |
| 5,435,945 | 7/1995 | Blouin . |
| 5,443,637 | 8/1995 | Long, Jr. et al. . |
| 5,494,709 | 2/1996 | Long, Jr. et al. . |
| 5,501,874 | 3/1996 | Yamamoto et al. . |
| 5,632,195 | 5/1997 | Zittel ........................................ 99/348 |
| 5,711,170 | 1/1998 | Johnson . |
| 5,721,012 | 2/1998 | Long, Jr. et al. . |

OTHER PUBLICATIONS

Matthews, C.W., "Section 3E —Screening", SME Mineral Processing Handbook, vol. 1, pp. 3E–1, 3E–32, 1985.

*Primary Examiner*—Laura Edwards
*Assistant Examiner*—J. A. Lorengo
*Attorney, Agent, or Firm*—Zarlee, Mckee, Thomte, Voorhees & Sease

[57] ABSTRACT

A machine for coating particulate material is provided with a housing and a cylindrical drum rotatably mounted within the housing. The drum includes a frame having opposite end rings and rails extending longitudinal between the end rings. A plurality of screen panels are slidably mounted on the rails to form a perforated drum side wall for holding particulate material. One or more spray nozzles are positioned within the drum for spraying a liquid solution onto the particulate material. An air inlet and outlet is provided to supply heated air for drying the solution on the particulate material.

17 Claims, 6 Drawing Sheets

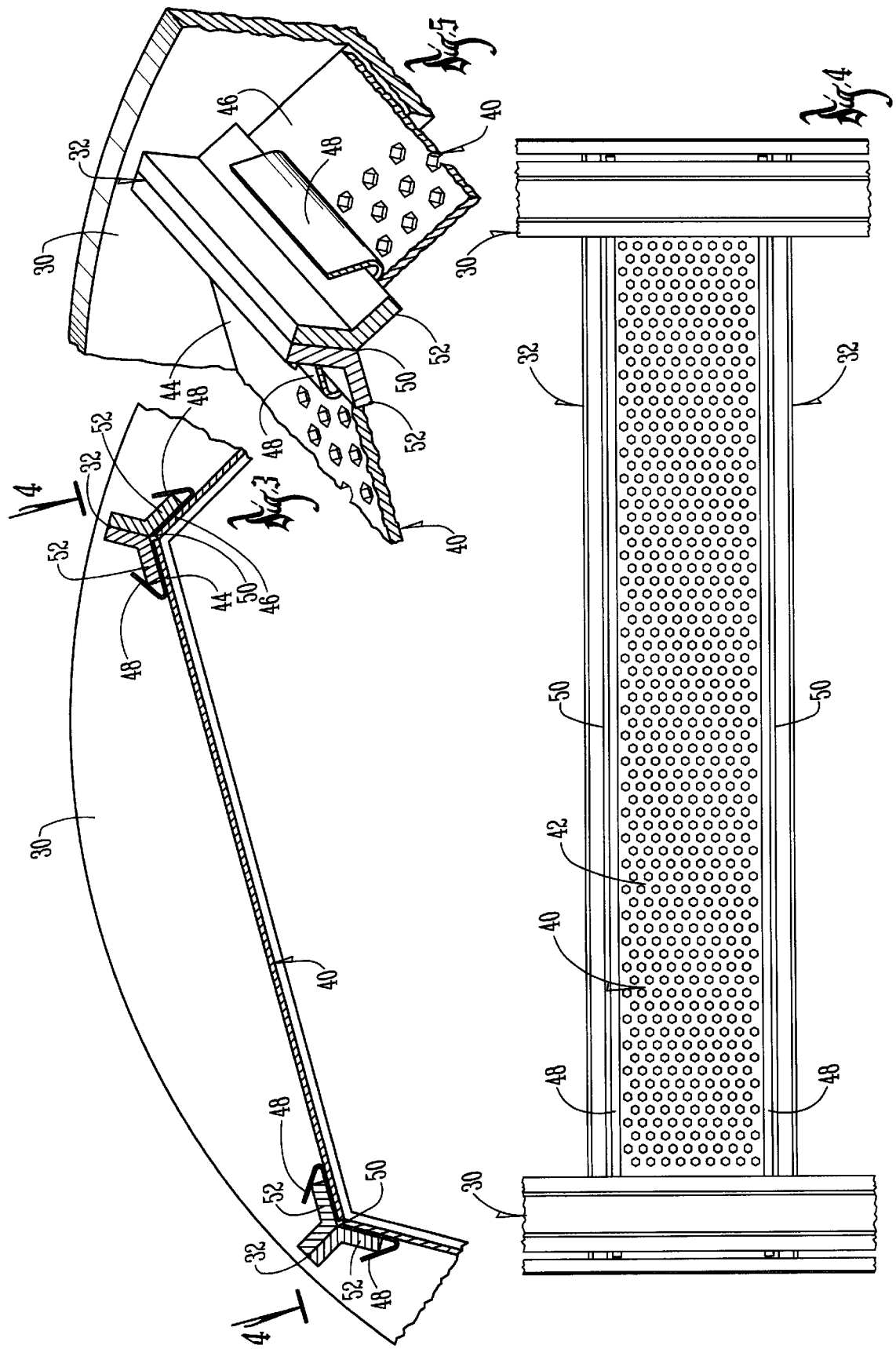

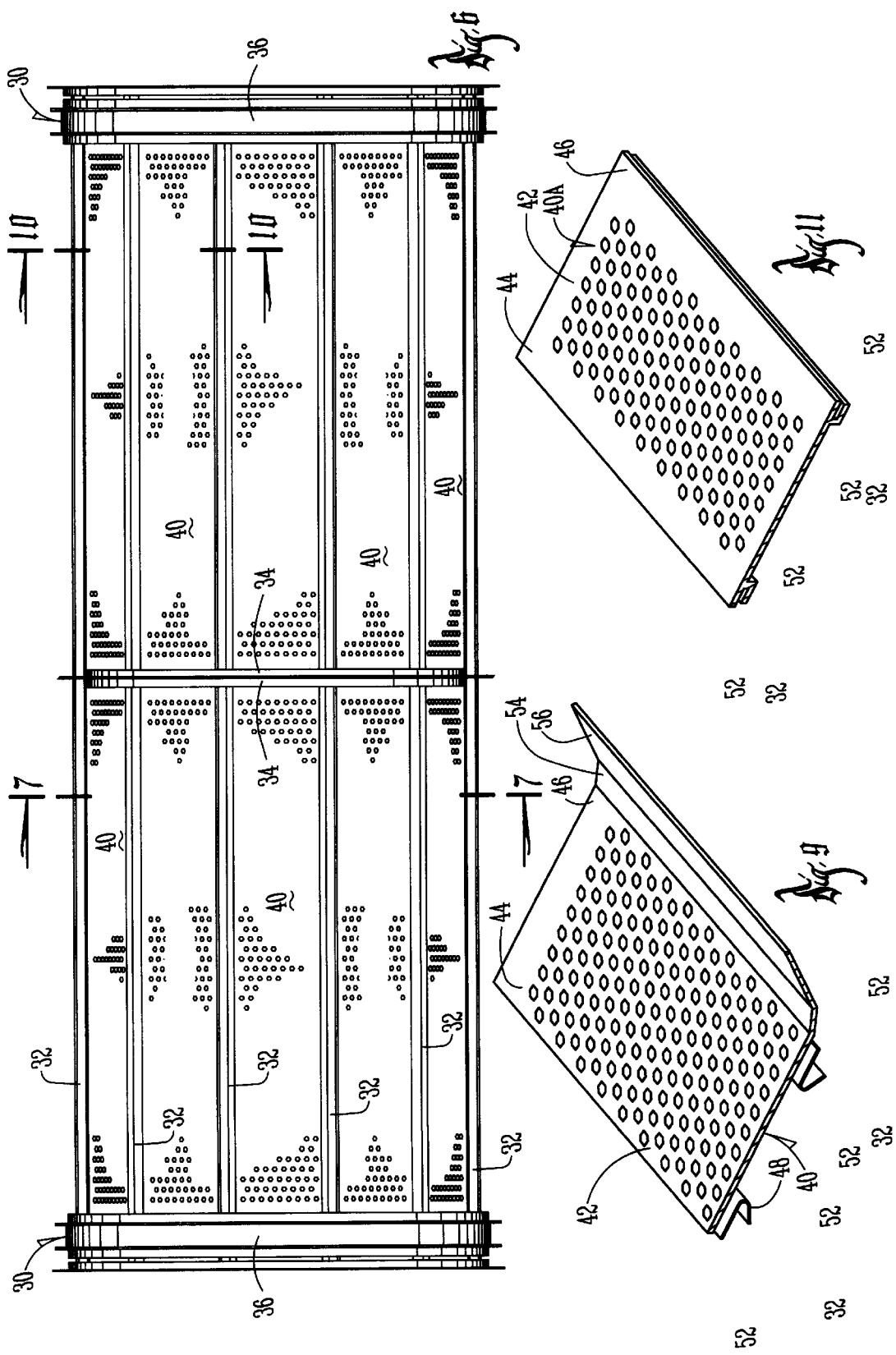

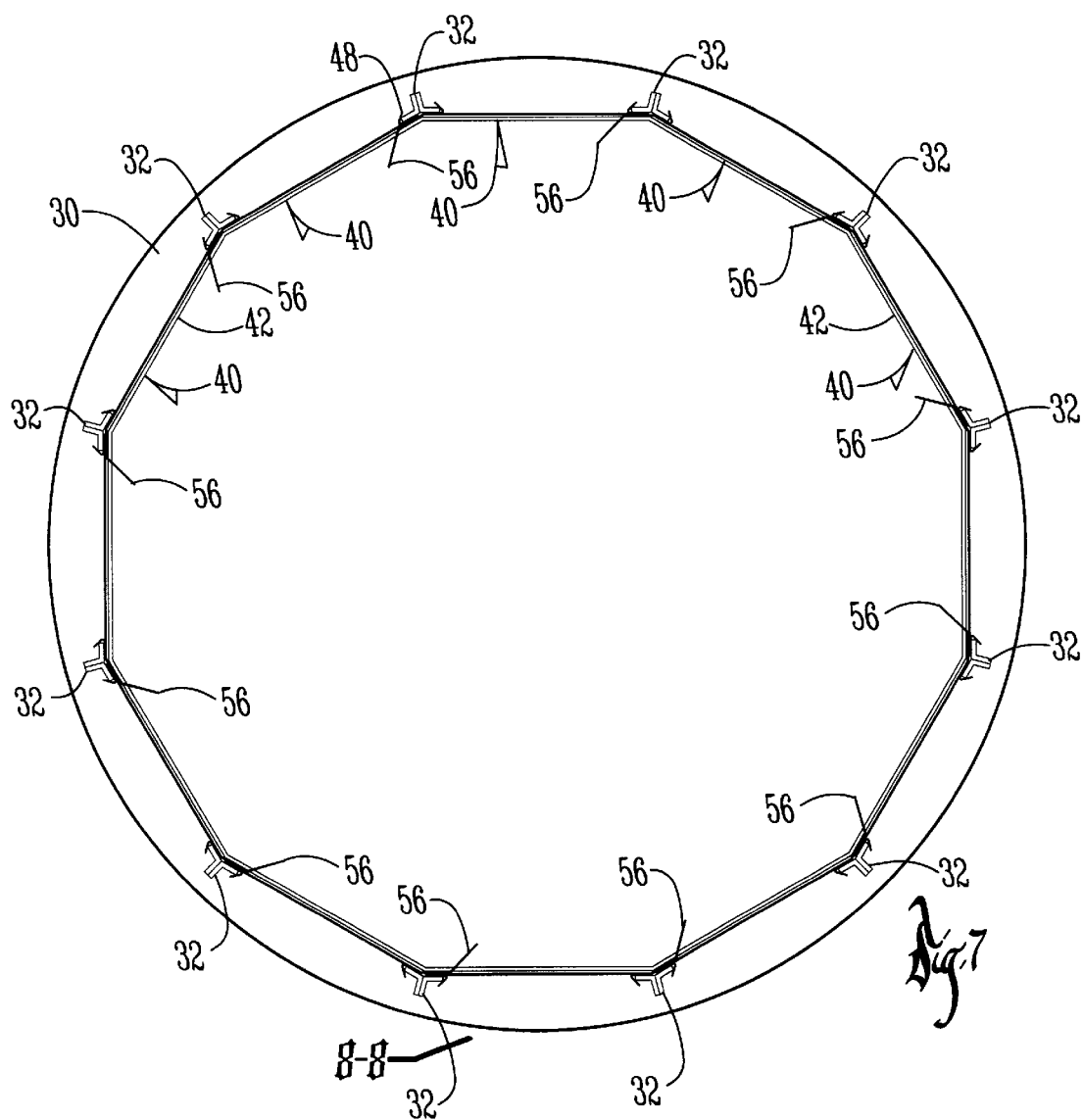

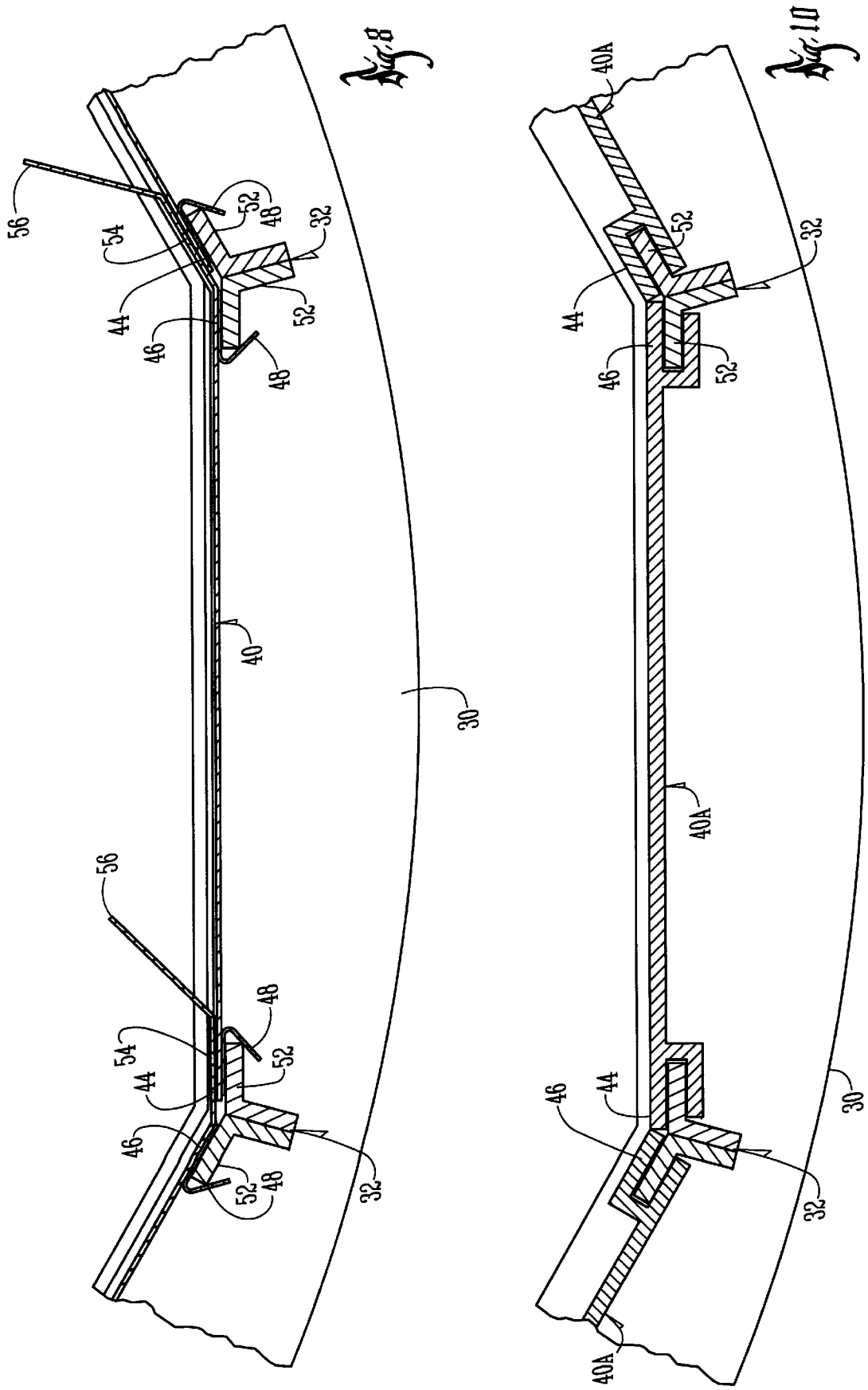

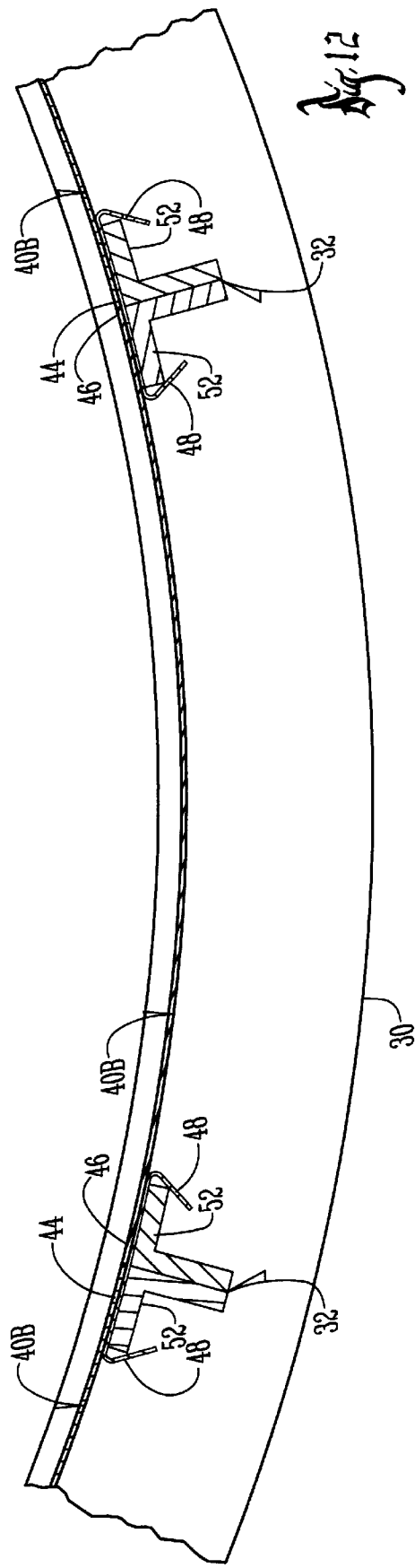

MACHINE FOR COATING PARTICULATE MATERIAL

BACKGROUND OF THE INVENTION

Rotating drum structures have been used to coat small particulate material, including seeds, pharmaceutical products, and food items such as breakfast cereals. Applicant's U.S. Pat. No. 5,443,637 discloses a continuous coating machine, while applicant's U.S. Pat. No. 5,376,175 discloses a batch coating machine. In both batch and continuous coating processes, the rotatable drum is perforated to allow air to pass therethrough so as to enhance drying of the liquid coating which is sprayed on to the particulate material. In such prior art machines, the perforated side wall of the drum is formed in one piece with perforations being a specific size. Particulates smaller than the perforations cannot be coated in the drum, since the particulate could pass through the perforations. Interchangeable drums may be used with each drum having different size perforations. The drums in a continuous coating machine are typically eight feet long and thus awkward and heavy to handle. Therefore, the physical exchanging of drum is time consuming and difficult.

Accordingly, a primary objective of the present invention is the provision of an improved rotatable drum for a particulate material coating machine wherein the drum includes interchangeable perforated panels.

Another objective of the present invention is the provision of a drum or reel for a particulate material coating machine including a drum frame and slidably mounted screen panels.

A further objective of the present invention is the provision of a particulate material coating machine wherein the size of the perforations in the drum can be quickly and easily changed to accommodate different sized particulate.

Another objective of the present invention is the provision of a machine for coating particulate material which is economical to manufacturer, and efficient and durable in use.

These and other objectives become apparent from the following description of the invention.

SUMMARY OF THE INVENTION

The machine for coating particulate material according to the present invention includes a housing with a drum or reel rotatably mounted therein. One or more spray nozzles are positioned within the drum for spraying a liquid coating solution onto the particulate material. The drum may be inclined to facilitate the longitudinal movement of particulate material from the inlet end of the drum to the outlet end of the drum.

The present invention is directed towards the construction of the drum. More particularly, the drum comprises a frame with opposite end rings and a plurality of rails extending longitudinally between the end rings. A plurality of screen panels are slidably mounted on the frame to form a perforated drum side wall for containing the particulate material as the coating solution is sprayed thereon. The panels may be flat such that the drum has a polygonal cross-section or may be curved such that the drum has a circular cross-section. Each panel has opposite side edges with a lip for slidably receiving the rails of the frame. Alternatively, the screen panels and rails may be coupled together using a tongue and groove construction. Each panel may also include an upwardly turned flange to facilitate lifting and mixing of the particulate material as the drum rotates. Preferably, the adjacent panels have overlapping edges, though the edges may abut one another. Multiple sets of screen panels may be interchanged with one another, with each set having different sized perforations to accommodate different sized particulate material being coated within the drum.

BRIEF DESCRIPTION OF THE DRAWINGS

FIG. 3 is an enlarged view of a portion of the drum taken along lines 3—3 of FIG. 2.

FIG. 4 is a plan view taken along lines 4—4 of FIG. 3 showing one of the screen panels of the drum.

FIG. 5 is a partial perspective view showing a portion of the drum frame with screen panels mounted thereon.

FIG. 6 is an elevational view of the drum frame with screen panels mounted thereon.

FIG. 7 is a sectional view taken along lines 7—7 of FIG. 6, and showing an optional lifting flange on the screen panels.

FIG. 8 is an enlarged view taken along lines 8—8 of FIG. 7.

FIG. 9 is a partial perspective view of the alternative embodiment screen panel having a lifting flange thereon shown in FIG. 8.

FIG. 10 is a partial sectional view showing another alternative embodiment of a screen panel mounted on the drum frame using a tongue and groove construction.

FIG. 11 is a partial perspective view of the alternative screen panel shown in FIG. 10.

FIG. 12 is a sectional view similar to FIG. 3 showing a curved screen panel.

DETAILED DESCRIPTION OF THE PREFERRED EMBODIMENT

Figures 1, 2:
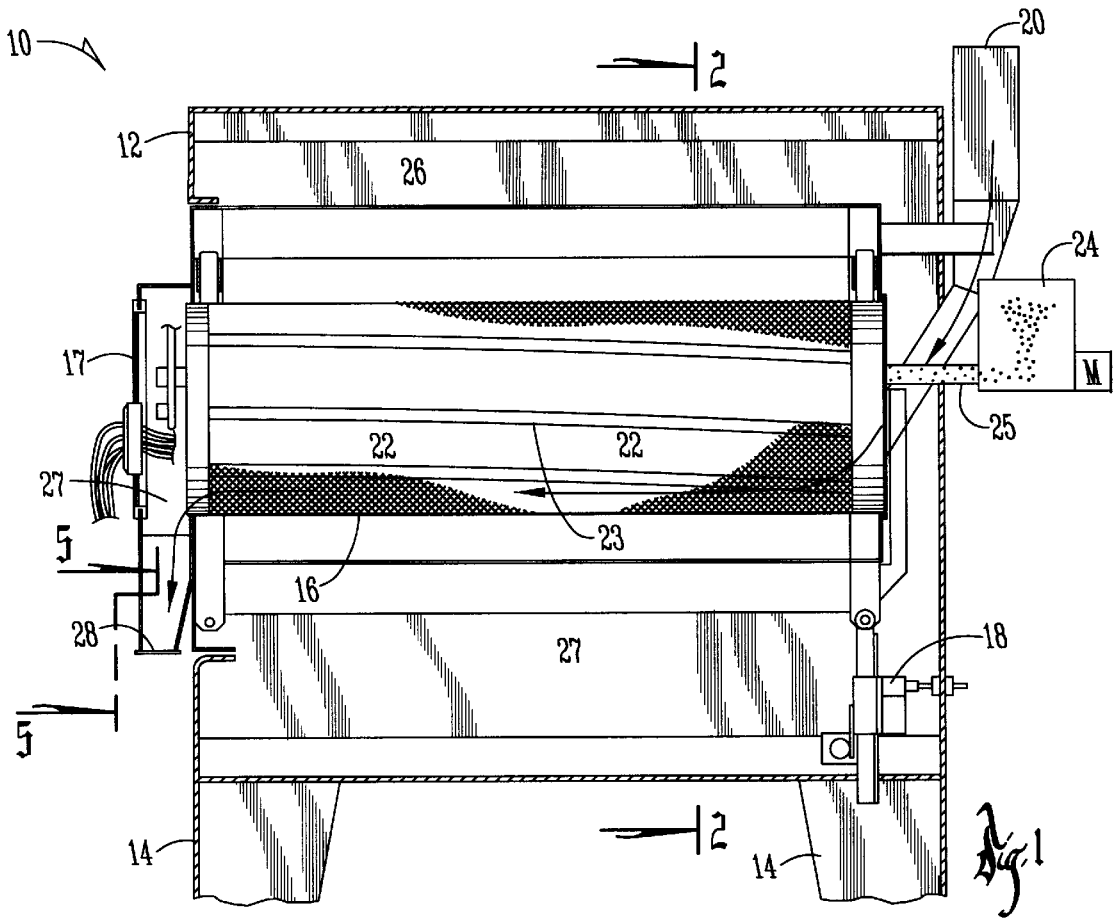
FIG. 1 is a side sectional view of a continuous coating machine for particulate material according to the present invention.
FIG. 2 is a section view taken along lines 2—2 of FIG. 1.

The particulate material coating machine of the present invention is generally designated in the drawings by the reference numeral 10. The machine includes a housing 12 with legs 14. A control panel (not shown) is provided for controlling the operation of the machine, preferably using a computer or micro-processor.

Mounted within the housing 12 is a cylindrical drum or reel 16. The drum 16 is mounted for rotation within the housing using conventional trunnion wheels operatively connected to a drive motor for rotating the drum 16 about its longitudinal axis. The housing includes a door 17 to provide access to the drum 16. The axis of the drum may be inclined relative to a horizontal plane using a jack 18. A product inlet chute or hopper 20 directs particulate material into the drum 16, wherein the material is coated by a liquid solution sprayed from one or more nozzles 22 mounted on a spray bar 23 extending into the drum 16. A powder hopper 24 may also be provided for supplying a powdered coating to the material in the drum 16 via a powder line 25. An air inlet plenum 26 supplies heated air to the interior of the drum 16 to facilitate drying of the solution on the particulate material. Air is exhausted from the drum through the outlet plenum 27. The coated material is discharged through the outlet chute 28.

The construction of the housing 12, the legs 14, the door 17, the jack 18, the inlet hopper 20, the nozzles 22 and spray bar 23, the powder hopper 24 and powder line 25, the air inlet and outlet plenums 26, 27, and the outlet chute 28 is conventional and does not form a part of the present invention.

The present invention is directed towards the construction of the drum 16. More particularly, the drum 16 includes a structural frame with opposite end rings 30 and a plurality of rails 32 extending longitudinally between the end rings 30. A central ring 34 may be provided for structural support. The end rings 30 have a circumferential surface 36 for engagement by the trunnion wheels (not shown).

A plurality of screen panels 40 are removably mounted on the drum frame. More particularly, each panel 40 includes a perforated sheet 42 with opposite side edges 44, 46. A lip 48 is welded or otherwise secured to the bottom of each sheet 42 at each edge 44, 46 thereof and at the opposite ends of each panel 40. Alternatively, the lips 48 may extend the full length of the panel 40. Each rail 32 of the drum frame includes a radially extending leg 50 with oppositely disposed arms 52 which are adapted to be received within the respective clips 48 on each panel 40, as best seen in FIGS. 3 and 5. Thus, the panels 40 can be quickly and easily slid into position on the rails 32 such that the panels 40 define the side wall of the drum 16.

As seen in FIG. 3, the edges 44, 46 of adjacent panels 40 abut one another. In an alternative embodiment shown in FIGS. 7 and 8, the side edge 46 of each panel 40 includes an extension 54 which overlaps the edge 44 on the adjacent panel 40. Also, an optional upturned flange 56 may be provided on each panel 40 so as to facilitate lifting and mixing of the particulate material as the drum 16 rotates.

FIGS. 10 and 11 show another alternative embodiment wherein the arm or tongue 52 of the rail 32 is received within a groove 58 formed on each side edge 44, 46 of the panels 40A. This tongue and groove construction permits easy slidable installment of the panels 40A on the rails 32.

As seen in FIGS. 3, 8, and 10, the perforated sheet 42 of the screen panels 40, 40A is flat. Thus, the drum 16 has a polygonal cross-sectional shape. In an alternative embodiment shown in FIG. 12, the screen panels 40B include a curved perforated sheet 42B such that the drum 16 has a circular cross-section. The panels 40B may also include the edge extension 54 and the flange 56 as on the flat panels 40, 40A.

A first set of panels 40, 40A or 40B are provided with perforations of one size, while a second set of panels is provided with perforations of a different size. Thus, the first and second sets of panels may be quickly and easily interchanged so as to accommodate different sized particulate material to be coated within the drum 16. The simple assembly of the panels 40, 40A and 40B on the rails 32 also facilitates cleaning of the drum by simply removing the panels from the rails 32 of the drum frame.

In the drawings and specification there has been set forth a preferred embodiment of the invention, and although specific terms are employed, these are used in a generic and descriptive sense only and not for purposes of limitation. For example, as the drum diameter and/or length increases, it may be desirable to use more panels to facilitate ease of handling. FIG. 2 shows a small diameter drum having six panels whereas FIG. 7 shows a large diameter drum having twelve panels. Changes in the form and the proportion of parts as well as in the substitution of equivalents are contemplated as circumstances may suggest or render expedient without departing from the spirit or scope of the invention as further defined in the following claims.

What is claimed is:

1. A machine for coating particulate material, comprising:

a housing;

a cylindrical frame rotatably mounted in the housing wherein the frame includes opposite end rings and plurality of rails extending between the end rings;

a plurality of rigid screen panels slidably mounted on the frame to form a perforated drum for holding particulate material wherein each panel has opposite edges with a lip adjacent each edge for slidably receiving one of the rails; and at least one spray nozzle positioned within the drum for spraying a coating solution onto the particulate material.

2. The machine of claim 1 further comprising an air inlet to supply air to the drum to dry the coating solution on the particulate material.

3. The machine of claim 1 wherein each panel is substantially flat such that the drum has a polygonal cross-section.

4. The machine of claim 1 wherein each panel is curved such that the drum has a circular cross-section.

5. The machine of claim 1 wherein the screen panels and rails are coupled together with a tongue and groove construction.

6. The machine of claim 1 further comprising an upwardly turned flange on each panel to facilitate mixing of the particulate material as the drum rotates.

7. The machine of claim 1 wherein the screen panels define a first set having uniform sized perforations, and further comprising another set of screen panels with different sized perforations for exchange with the first set of screen panels.

8. The machine of claim 1 wherein adjacent panels have overlapping edges.

9. The machine of claim 1 wherein the panels and frame are coupled together with a tongue and groove construction.

10. The machine of claim 1 wherein the frame has a longitudinal axis and the panels slide longitudinally onto the frame.

11. A machine for coating particulate material, comprising:

a housing;

a perforated drum rotatably mounted in the housing, the drum including a frame and a plurality of rigid screen panels mounted on the frame wherein each panel has opposite edges with a lip adjacent each edge for slidably receiving one of the rails;

the screen panels being selected from a plurality of sets of panels, each set having different sized perforations; and at least one spray nozzle in the drum for spraying a solution onto the particulate material.

12. The machine of claim 11 further comprising an air inlet to supply air to the drum to dry the coating solution on the particulate material.

13. The machine of claim 11 wherein each panel is substantially flat such that the drum has a polygonal cross-section.

14. The machine of claim 11 wherein the panels and frame are coupled together with a tongue and groove construction.

15. The machine of claim 11 further comprising an upwardly turned flange on each panel to facilitate mixing of the particulate material as the drum rotates.

16. The machine of claim 11 wherein adjacent panels have overlapping edges.

17. The machine of claim 11 wherein the frame has a longitudinal axis and the panels slide longitudinally onto the frame.

* * * * *